Nov. 16, 1937.   E. C. EKSTROMER   2,098,958
MULTIPLE MOTOR UNIT
Filed Aug. 12, 1936   4 Sheets-Sheet 2

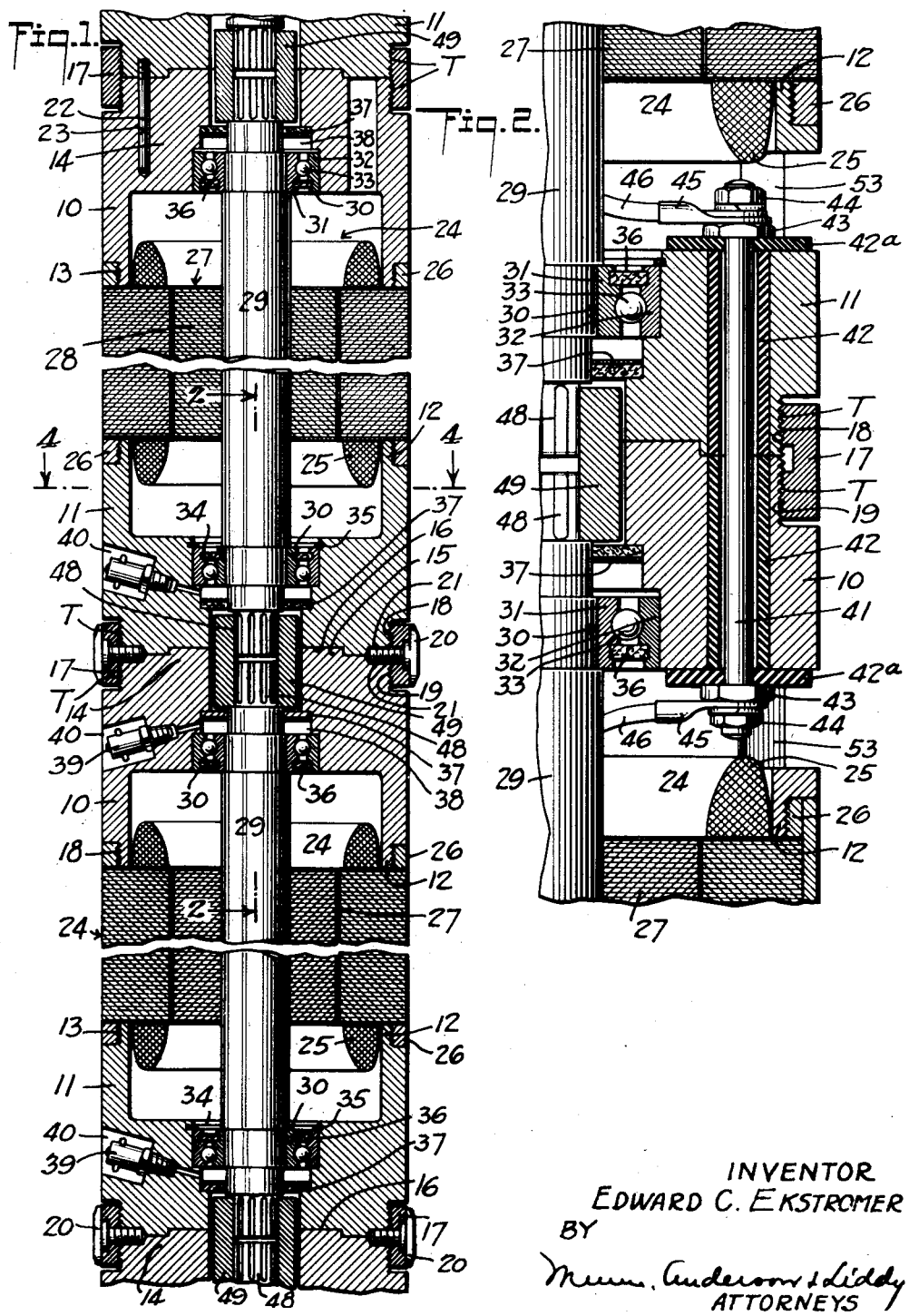

INVENTOR
EDWARD C. EKSTROMER
BY
Munn, Anderson & Liddy
ATTORNEYS

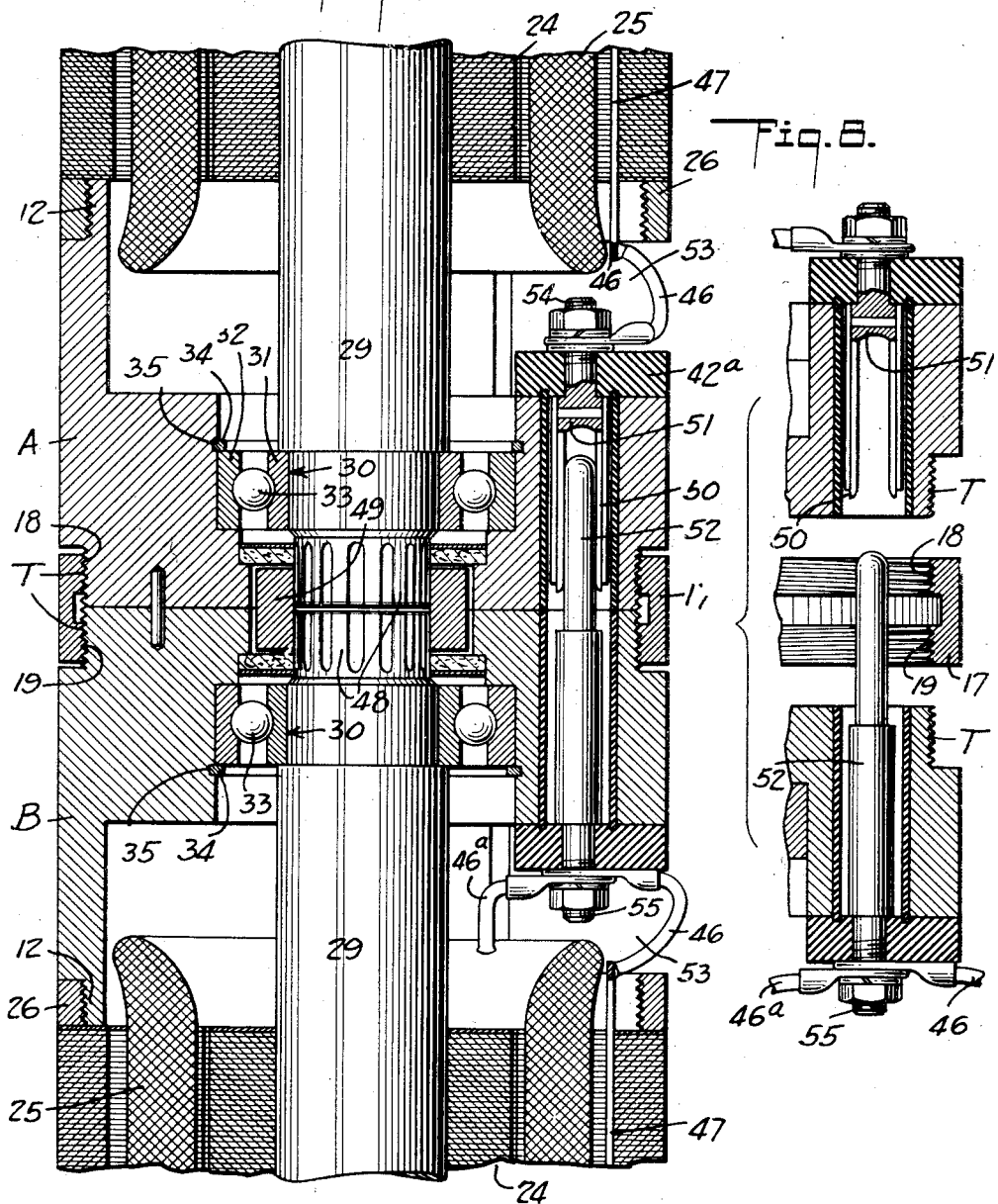

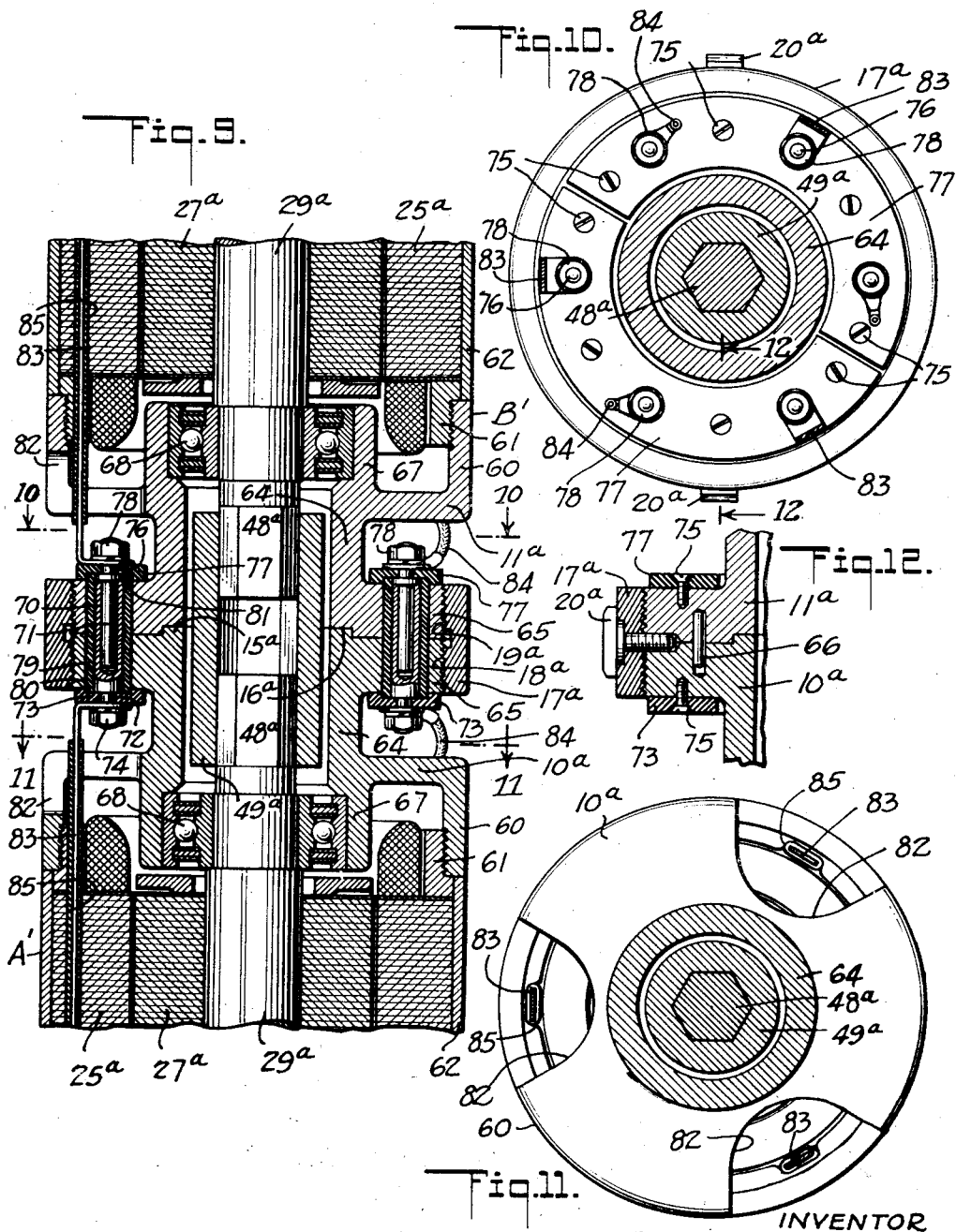

Patented Nov. 16, 1937

2,098,958

UNITED STATES PATENT OFFICE 2,098,958

MULTIPLE MOTOR UNIT

Edward C. Ekstromer, San Francisco, Calif., assignor to Electrolift Corporation, Reno, Nev., a corporation of Nevada Application August 12, 1936, Serial No. 95,557

15 Claims. (Cl. 171—252)

This invention relates to multiple motor units for underground or oil well pumps, and has particular reference to the class of motor units disclosed in Letters Patent of the United States No. 1,960,484, issued to me on May 29, 1934, and intended to be used in association with the customary reciprocable sucker rod of a pumping equipment. Multiple motor units as disclosed herein are adapted to be lowered into a well and disposed beneath the pump and operatively connected with a suitable motion changing mechanism such as the one disclosed in my Patent No. 1,799,458, April 7, 1931, whereby rotary motion of the motor shaft will be converted into reciprocable motion at the sucker rod.

Certain of the more important objects of the invention are as follows:

1. To provide, as distinguished from the structural features found in Patent No. 1,960,484, a simplified method of connecting the motor housing sections or shells to each other and for locking them against relative rotational motion;

2. To provide a multiple motor unit, the motors of which are of identical construction and adapted to be adjusted axially relative to each other and then secured together in a manner to defeat possible tendency of the motors to separate from each other when subjected to forces and strains generated when the motors are operating;

3. To provide a multiple motor unit having means for securing the motors in coupled relation to each other, said means serving in co-action with the shaft sections of the respective motors to secure and maintain substantially perfect alinement of said shaft sections;

4. To provide novel means by which the particular rotor shafts employed can be journaled in their respective housings to insure freedom of rotation of the shafts and for effectively resisting end thrust, of the shafts, thereby maintaining a constant relationship of the rotors to their co-acting stators;

5. To provide means in which the entailed labor required to assemble the motors will be appreciably less than was heretofore possible, a feature made possible by the employment of exceedingly effective means enabling the motors to be guided into coupled relation to each other and thereafter firmly and quickly locked together to provide a rigid unit adapted to be readily raised and lowered in the well as and when required while maintaining the housings in their intended co-axial relationship;

6. To provide a multiple motor unit in which all co-operable parts combine to provide a rigid structure of substantially the same form diametrically from one end of the structure to the other and almost entirely smooth externally, whereby to enable the unit to be readily received in a cylindrical exteriorly smooth protective case and easily lowered into or raised from the well without excessive resistance being offered to its movement through contact with the walls of the well hole;

7. To provide improved means for electrically coupling the main circuit conductors and for facilitating coupling and uncoupling of said conductors whenever occasion therefor arises;

8. To provide means at each end of each rotor shaft for journaling the shaft in its associated housing and for sealing lubricant charges within each of the journal bearings.

9. To provide means by which the bearings can be quickly supplied with lubricant from exteriorly of the structure;

10. To provide in a second embodiment of the invention disclosed herein means for urging the co-operable or complementary elements of an electrical coupling into good electrical connection with each other, automatically during the process of moving the motors axially as when coupling the motors to each other;

11. To provide, in said second embodiment of the invention, means by which the respective plugs and co-acting receptacles for the co-operable terminals of current conductors can be completely connected with the terminals of current conductors before jamming the motor housings together, the arrangement being such that no attention need be paid thereto after the motor housings are coupled.

Further objects will appear from the following description, reference being had to the accompanying drawings, in which Figure 1 is a partial sectional view showing the details of the motor unit;

Figure 2 is a view partly in vertical section and partly in elevation of two associated motor end bells showing the means for electrically interconnecting the motors, the section being approximately on line 2—2 of Figure 1;

Figure 7 is a partial sectional view of coupled portions of two motors, the unit showing a slightly modified form of electrical coupling for the main circuit conductor of adjacent motors;

Figure 8 is a fragmentary view in section of the plug and receptacle elements of the aforementioned electrical coupling employed in the form of the invention shown in Figure 7;

Figure 9 is a longitudinal sectional view of two coupled motors embodying modified forms of mechanical and electrical connections between the motors;

Figure 10 is a transverse sectional view taken on the line 10—10 of Figure 9;

Figure 11 is a sectional view taken on the line 11—11 of Figure 9;

Figure 12 is a fragmentary sectional view taken on the line 12—12 of Figure 10.

Figure 3:
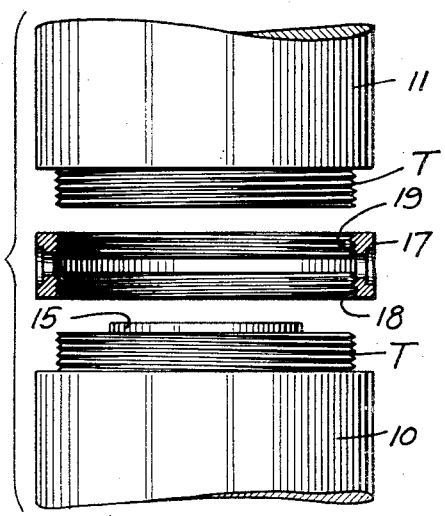
Figure 3 is a view partly in section and partly in elevation of the meeting ends of two motor end bells and the coupling ring for securing them together in axial alinement.

In Figure 1 I show a suitable number of motors arranged end to end and adapted to be enclosed in a smooth-walled, cylindrical casing such as the one shown in my prior Patent No. 1,960,484. These motors each include axially alined upper and lower metallic end bells 10 and 11, the confronting or open ends of which are formed with portions 12 of reduced diameter, the external surface of each of which is provided with a screw-thread 13. The upper end bell has its head or closed end 14 machined or stepped to provide a large diameter concentric boss 15, the flat face of which provides a ground joint which rests against a corresponding face or wall of the channel 16 in the complementary lower end bell 11 of the motor just above it. Thus it follows that the end bells are adapted to come in end to end engagement and can be moved axially to provide tight joints between said end bells such as will provide for maximum rigidity of the unit and enable the motors to be rigidly secured together, as intended. Concentric of the exterior threads T at the meeting ends of the axially alined motor end bells and co-acting with the reduced threaded surfaces of said end bells are internally threaded coupling rings 17 as shown clearly in Figure 3. These rings have right and left hand threads 18 and 19 and the threads T on the complementary end bells 10 and 11 are similarly formed so that on turning the rings, the end bells will move axially relative to each other, thus enabling the respectively stepped and cupped ends of the end bells to seat firmly against each other when the motor unit is fully assembled. Dowel screws 20 (Figure 1) pass through the rings and are extended into tapped semi-cylindrical openings 21 in respective portions of the meeting ends of the end bells as shown in Figure 1. The dowel screw heads extend beyond the outer surface of the motor end bells and are designed to fit into channels located on the inside of a cylindrical steel housing (not shown) within which the unit is enclosed and serve to keep the motors keyed in place to prevent rotational movement. The openings 21 can be formed after the rings are fully adjusted on said end bells and before the screws are associated with said rings. It follows, from this construction, that the end bells of the respective motors can and will be effectively secured against any possible relative rotation when the end bells are thus secured together.

Long guiding pins 22 carried by the end bell 11 are disposed parallel to the axis of the end bell and may enter the openings 23 in the heads of the complementary end bells 10 as shown in Figure 1.

The end bells 10 and 11 of each of the aforestated motors are disposed at the respective ends of a polyphase motor 24. These motors each consist of a primary or stator winding 25, the ends of said stators being fitted with collars 26, having threaded connection with the open threaded ends 12 of the complementary end bells 10 and 11. Within said stator winding is a rotor 27 with a secondary winding 28 of the squirrel cage induction type, like the motor disclosed in my prior Patent No. 1,960,484, and has no brushes or sliding contacts which would cause sparking.

Each of the rotors 27 is carried by a shaft 29, the ends of which are identical. The shaft of each rotor is journaled adjacent to its ends in bearings 30 supported in the respective end bells 10 and 11 of the motor. The bearings consist of inner and outer concentrically related race members 31 and 32 for bearing balls 33. The bearings 30 of the shafts 11 are retained in place in the end bells by resilient locking rings 34, expanded into receiving grooves 35 in said bells. The bearings in the end bells 10 are sufficiently like the bearings in the end bells 11 to require no further description. With respect to each said bearing, it will suffice to say that at one side of each thereof and mounted between the race members 31 and 32 are felt disks 36, or other suitable lubricant retainers. Spaced apart from the bearings at the opposite sides thereof and mounted in the end bells are similar felt disks 37, or lubricant retainers, the latter co-acting with the bearings to provide each end bell with a lubricant chamber 38 adapted to be supplied with a suitable lubricant through the fittings 39. The intake ends of these fittings are set in recesses 40 in the end bells and, as shown, said recesses are exteriorly exposed from the end bells to enable them to be readily connected with a source of lubricant supply under pressure.

Figure 4:
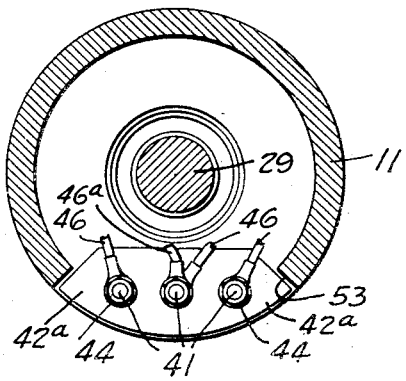
Figure 4 is a transverse section on line 4—4 of Figure 1.
Figure 6:
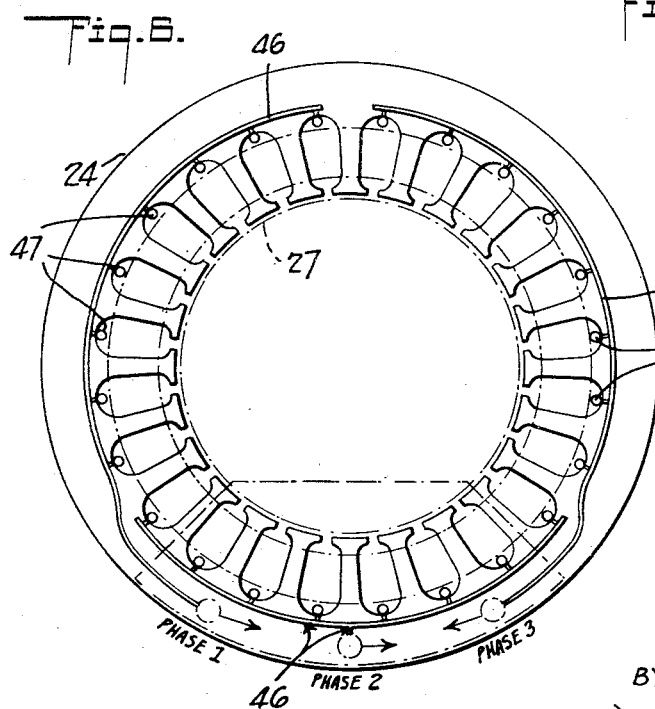
Figure 6 is a diagrammatic view of the polyphase motor stator punching for each motor, and showing one method and/or manner of conducting the main circuit conductors and the grouping of the respective phases of a three-phase arrangement.
Figure 5:
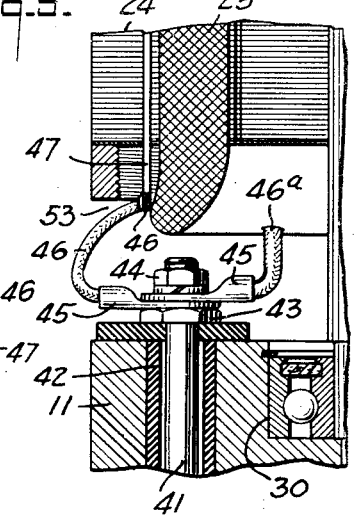
Figure 5 is a detail section through portions of two motor housings showing the manner of establishing the phase coupling between the main circuit conductors and the current feed strip of one phase of the rotor field.

In Figures 2, 4 and 5, it is noted that the electrical connection between the respective motors, carrying the current from one motor to the adjacent motors, consists of studs 41 passed through sleeves 42 of insulating material in the confronting heads of the motor end bells. The ends of these studs extend beyond said heads and have clamping nuts 43 and 44 between which the terminal ends 45 of the line conductors 46 are firmly secured, the innermost nuts 43 being engaged against the insulating washers or blocks 42a through which the ends of the studs project. As three phase motors are employed, it follows that three such studs 41 are provided at the meeting ends of the respective end bells, whereby current can be taken to the respective through wires 47 of each phase line conductor and to the stator field through the feeder 46a, as will be appreciated on reference to Figures 4, 5 and 6 of the drawings.

In the form of my invention shown in Figures 7 and 8, motors A and B are rigidly secured together in a manner precisely the same as described in the first form of my invention. As the motors are also the same as first above referred to, no additional description would seem necessary. It will suffice to say that when the end bells are initially assembled, they can be moved axially, thus coupling the alined shafts 29 and operatively setting the end bells into firm and exceedingly substantial end to end engagement with each other.

In each form of the invention, the shaft ends are identical. The shafts are formed with splined tongues 48, disposed relative to each other at the meeting end faces of the end bells to enable them to be received in the correspondingly shaped axial bore of the freely rotatable shaft coupling sleeve 49, as shown, to enable the sleeves to be removably set therein.

Referring further to Figures 7 and 8 of the drawings, the confronting end bells are provided with electrical connectors 50, the one end bell having three resilient receptacles 51 and the other said end bell having plugs 52 engageable in said receptacles. Only one complete connector is shown in Figure 7, but it is understood that three thereof are provided and related to each other, substantially as shown in Figure 4. Connectors of this type are disposed parallel to the axis of the motor and the plugs 52 are long enough to extend beyond the end of the motor of which they are a part, thereby enabling the plugs to be readily guided into their complementary receptacles, then forced into good electrical contact with said receptacles as the motors are being rigidly secured together and their shafts operatively connected, all of which will be thoroughly understood on reference to Figures 7 and 8. At the places in the end bells where the electrical connectors 50 are situated, the end bells are recessed at 53 for convenient connection of the line conductors to the binding posts 54 and 55 of the respective plug and receptacle elements of said connectors. It will be noted that in this form of my invention, the current conductors can be attached to said receptacle and plug elements before the motors are secured together, a feature which is not possible with the form shown in Figures 1 to 4, inclusive.

Any desired number of motors can be coupled together to provide a unit of suitable power for the purpose intended, that is to say, to enable a pump to be operated at any predetermined depth in the ground.

The uppermost motor of the unit employed will, of course, have its shaft coupled to means from which rotary motion can be converted into reciprocal motion at the sucker rod of the pump. As no claim is made to the pump and in view of the fact that in my prior Patent No. 1,799,458, a suitable motion changing mechanism for operating the pump is fully disclosed and described, such as would enable any person skilled in the art to practice the instant invention, no detail description of the pump or the motion changing means is made herein.

In the form of my invention disclosed in my prior Patent No. 1,960,484, it will be observed that the end bells of the motor are bolted together and to enable this to be done, it is required that at least one end bell of each motor be of greatly reduced external diameter. This did not lend itself to desired strength of the unit as a whole, and did not provide for the best arrangement of shaft bearings. Then, too, it is required that the fastening bolts which connect the end bells together be separately manipulated when the coupling is made.

In the form of my invention herein disclosed, the motor unit is substantially of the same diameter from one end thereof to the other and a unit of great strength and rigidity is provided. Furthermore, when the end bells are initially alined axially, and disposed in end to end relation, the single coupling sleeve 17 between each pair of motor housings can be very quickly operated to move the housings into firm engagement with each other. Then, too, the end bells can be more quickly and accurately alined axially than was possible heretofore. I stress all of the details of construction of the invention, such as provide beyond question and as stated above a sturdy unit in which all the motors can be moved axially by curvilinear motion imparted to each of the rings 17. I lay particular stress also upon a unit such as disclosed in Figures 7 and 8, wherein the rings 17 function in co-action with the electrical couplings 50 to bring the elements thereof in excellent electrical contact with each other.

I stress the form, construction and arrangements of cooperable parts of the unit by means of which the motor shafts operate in co-axial bearings that can be furnished with lubricant from outside the unit when the unit is removed from a housing (not shown).

A further important feature of the invention is directed to rotary coupling sleeves 17 in co-action with motors, the ends of the stators of which have threaded connection with the adjacent end bells of the unit.

It will also be noted, from the manner of mounting the shaft bearings in the heads of the end bells and by reason of the manner in which the shaft ends are machined, i. e., stepped, that each shaft is held against sliding axially relative to any other shaft of the series employed. As a direct result of this arrangement and construction of the parts, the rotors of the motors cannot shift axially relative to their associated stators. This is also important in that the current feed wires are at no time stressed such as might be detrimental to proper electrical connections being maintained.

Reference will now be had to Figures 9, 10, 11 and 12 showing modified forms of structural and electrical connections between two co-axial motors A' and B', the respective end bells 10a and 11a of the stators 25a of which are each provided with a cup portion 60 internally threaded for threaded connection with a stator ring 61 welded to one end of a cylindrical shell 62 enclosing the stator 25a. From the portion 60 of each end bell extends a tubular neck 64 terminating in a flange 65.

The flanges 65 of the respective end bells 10a and 11a are oppositely threaded externally to threadedly receive the oppositely threaded portions 18a and 19a of a coupling ring 17a which is locked to the flanges by dowel screws 20a, all in the same manner and for the same purpose as described in connection with the first form of the invention. A concentric boss 15a on one flange seating in a complementary recess 16a in the other flange to insure assembling of the end bells in co-axial relationship. Dowel pins 66 in the flanges aid the screws 20a (Figure 12) in locking the end bells against relative circumferential displacement. Projecting inwardly from the cup portion 60 of each flange 65 is a tubular extension 67 serving as a support for an anti-friction bearing 68 in which is journaled the shaft 29a of a rotor 27a, the shafts of the respective motors A' and B' extending through the end bells and having splined or keyed connection at 48a with a coupling sleeve 49a so that the shafts will operate as a unit.

To provide for electrically connecting the line conductors of each phase in series through the coupled motors, and the phase windings of one stator to those of the next, all automatically in response to mechanical coupling of the end bells as above described, the following means is provided. This means includes axially separable connectors one for each line phase conductor and phase winding, so that with three phase current as is considered to be utilized in the present instance, there will be six of such connectors equally spaced around the flanges 65 so as to be supported thereby and insulated therefrom.

The separable connectors each comprise a female member 70 of tubular form, and a male member 71 in the form of a plug adapted to be snugly received in the female member. The female members are provided with threaded shanks 72 extending through openings in a two section terminal ring 73 of insulating material, and are secured to the ring by nuts 74 on the shanks, the sections of the ring being secured to the flange 65 of the motor by screws 75 (Figure 12).

The male members 71 are provided with threaded shanks 76 passing through openings in a two-section terminal ring 77 of insulating material, and are secured to the ring by nuts 78 on the shanks 76, the sections of the ring 77 being secured to the flange 65 of the other motor in the same manner as described for the terminal ring 73.

The female and male connectors as thus supported on the respective flanges 65, extend freely through alined openings therein and are enclosed by sleeves 79 of insulating material, the ends of which are received in circular recesses 80 and 81 in the terminal rings 73 and 77, respectively, so as to co-act therewith in completely insulating the connectors from all metal parts of the motor assemblies A' and B'.

As shown in Figure 11, the cup portions 60 of the flanges 65 of the respective motors are provided with three openings 82, one for each line phase conductor 83 and stator phase lead 84 through which these elements pass from the respective separable connectors as shown in Figure 9, the line conductors passing through slots 85 in the stator laminations to the terminal ring at the other end of the respective motor and the phase leads being connected to the stator windings within the coupled end bells.

In assembling the motors, their end bells and the separable connectors are respectively connected mechanically and electrically by a relative axial movement of the motors towards each other so that when the flanges 65 have been brought into abutting relationship by rotating the coupling ring 17a, and the latter is locked by the screws 20a, the rotor shafts of the two motors will also be operatively connected.

I claim:

1. A multiple motor unit for pumps comprising a plurality of motors arranged in end to end relation to each other; means serving to operatively connect one motor to another to enable the combined energy developed by all thereof to be transmitted to a mechanism to be driven; and means concentrically related to the axis of said unit and co-operable with said motors to move same axially into end to end engagement and rigidly securing them to each other.

2. A multiple motor unit for pumps comprising a plurality of motors arranged in end to end relation to each other; interengageable electrical coupling elements on the respective motors; each of said motors including a rotatable shaft, the shafts of said motors being co-axial relative to each other; means for moving the motors axially to dispose them in end to end engagement with each other and for moving the electrical coupling elements in an interengaging direction; and means of which the ends of the motor shafts form parts for operatively connecting said shafts together by moving the motors axially for end to end engagement thereof.

3. A multiple motor unit for underground pumps comprising a plurality of cylindrical motors having shafts co-axially related to each other and operatively connected detachably; and means on adjacent motors including a single rotary coupling member co-operable therewith to relatively move the motors axially, and rigidly secure one motor to another in end to end engagement, whereby the motors unite to provide an elongated rigid body.

4. A multiple motor unit comprising coaxially arranged motors; means for threadedly connecting the motors for relative movement axially; means co-acting with the first means for locking the motors against disconnection; and means by which the combined energy developed by said motors can be delivered from said unit.

5. A multiple motor unit of the class described as comprising a plurality of coaxially related electric motors, each provided with a driving shaft, couplings at the meeting ends of said motors and having driving connections with the shaft ends of the adjacent motors; the motors having oppositely threaded portions; and a coupling member co-operable with said portions to move said motors axially to maintain rigid end to end engagement of the motors with their shafts operatively connected by said couplings.

6. A multiple motor unit including coaxial motors having stators the ends of which are interfitting and externally threaded; a rotatable sleeve threaded co-operably with the threaded ends of the stators and adapted to be turned thereon to move the stators axially into end to end engagement with each other; and means for securing the sleeve against rotation such as will prevent axial separation of the stators from each other.

7. A multiple motor unit including coaxial related motors having end bells; means adjustable circumferentially of the end bells at the meeting ends thereof for relatively moving the motors axially; means for preventing turning of the end bells relative to each other; and means for preventing turning movement of the circumferentially adjustable means when the end bells are in intended positions of axial adjustment relative to each other.

8. In a multiple motor unit, a cylindrical structure of substantially uniform external diameter throughout, said structure comprising separable coaxial motors each having a driving shaft, means for operatively connecting the shafts of the motors to enable the combined energy of the motors to be delivered from the unit; and means on the motors including a member adjustable circumferentially of the motors at the joinders thereof for moving the motors together and maintaining them rigidly connected.

9. A multiple motor unit comprising a plurality of motors arranged in end to end relation and each of which includes a stator having end bells and a rotor journaled in the stator; means co-acting with the end bells of the motors to axially advance one motor towards the next by drawing their confronting end bells into rigid engagement so as to unite the plurality of motors into a single elongated and rigid unit; means co-acting with the first means to lock the motors against disconnection; means for operatively connecting the rotors of the motors to enable the combined energy of the motors to be obtained; and means for electrically connecting the motors for the supply of current thereto.

10. A multiple motor unit comprising a plurality of motors arranged in end to end relation and each of which includes a stator having end bells and a rotor journaled in the stator; an end bell of one motor confronting an end bell of the next motor, and said bells being oppositely threaded; a coupling member having oppositely threaded portions co-acting with the corresponding threads of said end bells, to detachably and rigidly secure them together; means for locking the coupling member against unscrewing movement; means for operatively connecting the rotors of the motors to enable the combined energy of the motors to be obtained; and means for supplying current to the motors.

11. A multiple motor unit comprising a plurality of motors arranged in end to end relation and each of which includes a stator having end bells and a rotor journaled in the stator; means co-acting with the end bells of the motors to axially advance one motor towards the next by drawing their confronting end bells into rigid engagement so as to unite the plurality of motors into a single elongated and rigid unit; means co-acting with the first means to lock the motors against disconnection; means for operatively connecting the rotors of the motors to enable the combined energy of the motors to be obtained; and means for electrically connecting the motors for the supply of current thereto; said last means including two part separable connectors one part of which is supported on the stator of one motor and the other part of which is supported on the stator of the next adjacent motor for electrical connection with the first said part in response to relative movements of the motors axially towards each other.

12. A multiple motor unit comprising a plurality of motors arranged in end to end relation and each of which includes a stator having end bells and a rotor journaled in the stator; the end bells having cup portions and end flanges spaced from the cup portions; an end flange of one stator confronting an end flange of the next stator, and said flanges being oppositely threaded; a coupling member having oppositely threaded portions co-acting with the corresponding threads of said flanges, to detachably and rigidly secure them together; means for locking the coupling member against unscrewing movement; means for operatively connecting the rotors together; and means for supplying current to the motors.

13. A multiple motor unit comprising a plurality of motors arranged in end to end relation and each of which includes a stator having end bells and a rotor journaled in the stator; the end bells having cup portions, and end flanges spaced from the cup portions; an end flange of one stator confronting an end flange of the next stator, and said flanges being oppositely threaded; a coupling member having oppositely threaded portions co-acting with the corresponding threads of said flanges, to detachably and rigidly secure them together; means for locking the coupling member against movement; means for operatively connecting the rotors together; axially separable two-part connectors supported by and insulated from said flanges; and conductors leading from the connector parts through the respective end bells to the motors.

14. A multiple motor unit comprising a plurality of motors arranged in end to end relation and each of which includes a stator having end bells and a rotor journaled in the stator; the end bells having cup portions, and end flanges spaced from the cup portions; an end flange of one stator confronting an end flange of the next stator, and said flanges being oppositely threaded; a coupling member having oppositely threaded portions co-acting with the corresponding threads of said flanges, to detachably and rigidly secure them together; means for locking the coupling member against unscrewing movement; means for operatively connecting the rotors together; terminal blocks of insulating material secured to said flanges; two part separable connectors supported by said blocks, and electrically connectible in response to axial movement of adjacent motors relatively towards each other; and conductors leading from the connector parts through the respective end bells to the motors.

15. A multiple motor unit for pumps comprising a plurality of motors arranged in end to end relationship and having coupling portions concentrically related to their axes; a single coupling member co-operable with said portions of adjacent motors to relatively move the latter into engagement and rigidly secure them together; and means for operatively connecting one motor to another to enable the combined energy of the motors to be utilized.

EDWARD C. EKSTROMER.